Patented Oct. 24, 1922.

1,433,226

UNITED STATES PATENT OFFICE.

CHARLES W. PORTER, OF BERKELEY, CALIFORNIA.

PROCESS OF AND COMPOSITION FOR PREVENTING RUST.

No Drawing.    Application filed April 8, 1920. Serial No. 372,266.

*To all whom it may concern:*

Be it known that I, CHARLES W. PORTER, a citizen of the United States, and a resident of Berkeley, county of Alameda, and State of California, have invented a new and useful Process of and Composition for Preventing Rust, of which the following is a specification.

My invention relates to rust preventing compounds and one of the objects of the invention is to provide a composition of such character that iron may remain indefinitely in contact with water containing a small quantity of the composition, without rusting.

Another object of the invention is the provision of a composition which may be dissolved in the water of internal combustion engine radiators to prevent the oxidizing of the radiator structure.

The invention possesses other features of advantage, some of which, with the foregoing, will be set forth in the following description of my invention. It is to be understood that I do not limit myself to the showing made by the said description, as I may adopt variations of the preferred form within the scope of my invention as set forth in the claims.

It is known that iron does not rust in the presence of metallic hydroxides such as sodium hydroxide, potassium hydroxide or ammonium hydroxide, or any other source of hydroxide ions, but it is difficult to provide and maintain in any solution, a concentration of these inorganic bases sufficient to prevent oxidation, without causing corrosion of a different kind which is equally injurious to the metal.

In experimenting with a number of organic bases including amyl amine, butyl amine and pyridine, I found it possible, especially with the aliphatic amines to prevent the formation of rust without causing injury of any kind. These bases, however, are very difficult to synthesize and hence are costly.

Therefore I have conceived the idea of combining organic and inorganic bases in such proportions that the inorganic bases would function as sources of hydroxide ions up to a certain concentration not sufficient to effect other deleterious changes in the iron subjected thereto, and the organic bases would supply the added strength of solution necessary for full protection, and being volatile, would protect iron not directly immersed, but in contact with the vapor of the solution. This characteristic of the organic bases is of importance since the inorganic bases with the exception of ammonia are not volatile. Ammonia alone is unsuitable on account of its extreme volatility, although it is useful as a reagent to soften the water by precipitation of the calcium and magnesium salts ordinarily present. It cannot however entirely replace the less volatile amines since it rapidly distills from solution when heated.

Broadly then, my new composition comprises an aqueous solution of an aliphatic amine such as amyl amine and a metallic hydroxide such as sodium hydroxide. I may use amyl amine alone, or in combination with pyridine which is less active, but also less expensive, and I may also use in aqueous solution two of the metallic hydroxides such as sodium hydroxide and ammonium hydroxide and two of the aliphatic amines, such as amyl amine and butyl amine.

The minimum concentration of sodium hydroxide required to prevent the rusting of iron in distilled water is about .01 of 1%. A concentration greater than .1 of 1% is unsafe. Amyl amine affords complete protection in all concentrations between .01 of 1% and 1%, and is safe within this range.

A formula giving satisfactory results is the following:

| | |
|---|---|
| Distilled water | 1000 parts. |
| Sodium hydroxide | 10 parts. |
| Ammonia | 5 parts. |
| Amyl amine | 5 parts. |
| Pyridine | 1 part. |

This solution affords protection to iron in contact with it and its vapor when diluted with as much as fifty times its volume of water. To protect an automobile radiator from all danger of rust, such a quantity of the solution, in accordance with the above formula, is added as will amount to 2% to 3% of the water in the radiator.

If ordinary water is used instead of distilled water, enough more of the reagent must be used to give the above indicated concentrations after the precipitation of the calcium and magnesium salts present in the water.

The proportions of the components in the formula given are subject to considerable variation, and some of them may be omitted without materially altering the result viewed strictly from a chemical standpoint, but the ingredients in the proportions named have been found to give a satisfactory mean, from the viewpoint of chemical reaction, cost of material and lasting qualities.

Another formula giving splendid results is as follows:

Water _____ 1000 parts.
Sodium hydroxide__ 10 to 15 parts.
Amyl amine_____ 5 to 10 parts.

For use, this solution may be diluted with forty to fifty times its volume of water.

I claim:

1. A composition for preventing rust comprising an aqueous solution of a volatile aliphatic amine.

2. A composition for preventing rust comprising an aqueous solution of a volatile aliphatic amine and a soluble metallic hydroxide.

3. A composition for preventing rust in accordance with the following formula: water 1000 parts, sodium hydroxide 10 to 15 parts, amyl amine 5 to 10 parts.

4. A composition for preventing rust in accordance with the following formula: water 1000 parts, sodium hydroxide 10 parts, ammonium hydroxide 5 parts, amyl amine 5 parts, pyridine 1 part.

5. The process of treating iron to prevent the rusting thereof which comprises subjecting the iron to the action of an aliphatic amine.

6. The process of treating iron to prevent the rusting thereof which comprises subjecting the iron to the action of an aliphatic amine and a metallic hydroxide in an aqueous solution.

7. The process of treating iron to prevent the rusting thereof which comprises subjecting the iron to the action of sodium hydroxide and amyl amine in aqueous solution.

8. A composition for preventing rust comprising a volatile aliphatic amine.

9. A composition for preventing rust comprising a solution of a volatile aliphatic amine.

In testimony whereof, I have hereunto set my hand.

CHARLES W. PORTER.